United States Patent [19]

Herz

[11] Patent Number: 5,325,201
[45] Date of Patent: Jun. 28, 1994

[54] PSEUDO-RANDOM NUMBER GENERATOR BASED ON A VIDEO CONTROL COUNTER

[75] Inventor: William Herz, Newark, Calif.

[73] Assignee: Sony Electronics Inc., Park Ridge, N.J.

[21] Appl. No.: 997,777

[22] Filed: Dec. 28, 1992

[51] Int. Cl.⁵ .............................................. H04N 5/14
[52] U.S. Cl. ..................................... 348/571; 364/717; 380/46
[58] Field of Search ............... 358/133, 160, 166, 167, 358/426; 364/717; 380/46; H04N 5/14

[56] References Cited

U.S. PATENT DOCUMENTS

| | | | |
|---|---|---|---|
| 3,811,038 | 5/1974 | Reddaway | 235/152 |
| 3,958,077 | 5/1976 | Ross et al. | 358/133 |
| 4,161,041 | 7/1979 | Butler | 365/244 |
| 4,318,126 | 5/1982 | Sassler | 358/141 |
| 4,408,298 | 10/1983 | Ruhland | 364/717 |
| 4,438,501 | 3/1984 | Weber | 364/717 |
| 4,568,966 | 2/1986 | Lippel | 358/138 |
| 4,667,301 | 5/1987 | Chiu | 364/717 |
| 4,791,594 | 12/1988 | Harney | 364/717 |
| 4,888,640 | 12/1989 | Acampora | 358/133 |
| 4,896,213 | 1/1990 | Kobo | 358/167 |
| 4,928,310 | 5/1990 | Goutzoulis | 364/717 |
| 4,959,717 | 9/1990 | Faroudja | 358/166 |
| 4,965,668 | 10/1990 | Abt | 358/133 |
| 5,136,371 | 8/1992 | Savatier et al. | 358/136 |
| 5,235,423 | 8/1993 | Dunbar et al. | 358/160 |

FOREIGN PATENT DOCUMENTS

3214809 9/1991 Japan ................................. 364/717

Primary Examiner—James J. Groody
Assistant Examiner—Chris Grant
Attorney, Agent, or Firm—Jeffrey J. Blatt

[57] ABSTRACT

An assembly of serially coupled XOR gates and an assembly of serially coupled shift register-XOR gate pairs are provided to a digital video system. The two assemblies are serially coupled to each other. The assembly of XOR gates generates a shift-in bit for the assembly of shift register-XOR gate pairs based on a cooperatively selected bit of a video control counter and a number of cooperatively selected feedback bits from the XOR gates of the assembly of shift register-XOR gate pairs it received as inputs. The assembly of shift register-XOR gate pairs in turn generates a pseudo-random number based on the shift-in bit and additional cooperatively selected bits of the video control counter. The XOR gate outputs of the assembly of shift register-XOR gate pairs are cooperatively mapped to the various bits of generated pseudo-random number. The pseudo-random number sequence is repeated when the video control counter is reinitialized to a predetermined value and the shift registers are cleared to a predefined state. The sequence length is sufficiently long to outlast a run of the video control counter before it is reinitialized for a new instance of the specified area controlled by the video control counter.

10 Claims, 4 Drawing Sheets

PSEUDO-RANDOM NUMBER GENERATOR BASED ON A VIDEO CONTROL COUNTER

BACKGROUND OF THE INVENTION

1. Field of the Invention:

The present invention relates to the field of pseudo-random number generation and digital video systems. More specifically, the present invention relates to the generation of replicable pseudo-random numbers in a digital video system.

2. Background

A pseudo-random number generator generates a sequence of random numbers starting from a first random number by means of an initial value of zero and a predetermined algorithm. The predetermined algorithm is first applied to the initial value of zero to generate the first random number. The predetermined algorithm is then applied again to the first random number to generate the second random number. Each successive random number is generated in this manner, applying the predetermined algorithm to the previously generated random number. Although the pseudo-random numbers are predetermined by the initial value and the chosen algorithm, they provide a good approximation for random numbers that are mutually independent and uniformly distributed in a given interval.

Various digital apparatus for generating pseudo-random sequence are known. Included among these apparatus are those that use what's known as the generalized feedback shift register (GFSR) process. Typically, in these GFSR process based pseudo-random number generators, an n-bit pseudo-random number is obtained by serially shifting out n bits from a shift register or a shift register chain. Inputs are serially loaded in the shift register or shift register chain.

The focus of successive generations of pseudo-random number generators has been primarily on improving the length of the pseudo-random number sequence before the generated pseudo-random numbers would start to repeat themselves. However, for many digital video applications, including controllable dynamic companding the sequence length requirement is not very long. An equally important requirement is the requirement for the pseudo-random number generation to be controllable and repeatable. In other words, it is important for the pseudo-random number sequence to be repeatable within a specified area of the video image, such as a field, a line or a frame. As will be disclosed, the method and apparatus of the present invention for generating pseudo-random numbers based on a video control counter achieves the above described desirable results.

SUMMARY OF THE INVENTION

A method and apparatus for generating replicable pseudo-random numbers in a digital video system based on a video control counter of the digital video system is disclosed. Under the disclosed method and apparatus, numbers that provide a good approximation for random numbers that are mutually independent and uniformly distributed within a specified area of a video image controlled by a video control counter are advantageously generated using the video control counter. The sequence length of the pseudo-random numbers is sufficiently long to outlast a run of the video control counter before the video control counter is reinitialized for a new instance of the specified area of the video image ft controls. Additionally, the pseudo-random number sequence generated is advantageously controllable and may be replicated for different instances of the same specified area of the video image controlled by the video control counter.

The advantageous results are achieved by providing an assembly of serially coupled XOR gates and an assembly of serially coupled shift register-XOR gate pairs to a digital video system. The two assemblies are serially coupled to each other. The assembly of XOR gates generates a shift-in bit for the assembly of shift register-XOR gate pairs based on a cooperatively selected bit of a video control counter and a number of cooperatively selected feedback bits from the XOR gates of the assembly of shift register-XOR gate pairs, it received as inputs. The assembly of shift register-XOR gate pairs in turn generates a pseudo-random number based on the shift-in bit and additional cooperatively selected bits of the video control counter. The XOR gate outputs of the assembly of shift register-XOR gate pairs are cooperatively mapped to the various bits of generated pseudo-random number. The pseudo-random number sequence is repeated when the video control counter is reinitialized to a predetermined value, e.g. zero, and the shift registers are cleared to a predefined state, e.g. a zero state.

The provision of the various bits of the video control counter to the two assemblies, the mapping of the XOR gate outputs of the shift register-XOR gate pairs assembly to the various bits of the generated pseudo-random numbers, and the provision of the various bits of the generated pseudo-random numbers as feedback bits to the XOR gates assembly, are coordinated in a complimentary manner, such that the desired randomness, sequence length and replicability are achieved.

In one embodiment, where five-bit pseudo-random numbers are generated based on a five-bit horizontal pixel counter, i.e. the video control counter being the horizontal pixel counter, the XOR gates assembly comprises three serially coupled XOR gates, and the shift register-XOR gate pairs assembly comprises five serially coupled shift register-XOR gate pairs. For this embodiment, the lowest order bit of the horizontal pixel counter is provided to the first XOR gate of the XOR gates assembly. The second, third, and fourth lowest order bits of the horizontal pixel counter are provided order to the second, first, and third XOR gate of the shift register-XOR gate pairs assembly respectively. The highest order bit of the horizontal pixel counter is provided to the fourth and fifth XOR gate of the shift register-XOR gate pairs assembly. The first through fifth XOR gate outputs of the shift register-XOR gate pairs assembly generate the highest, the lowest, second lowest, third lowest, and second highest order bits of the pseudo-random numbers respectively. The highest, second highest, and second lowest order bit of a generated pseudo-random number are provided to the first through third XOR gate of the XOR gates assembly as feedback bits.

As a result, the five-bit numbers generated provide a good approximation for five-bit random numbers that are mutually independent and uniformly distributed within a horizontal line of the video image. The sequence length of the five-bit pseudo-random numbers are sufficiently long to outlast a run of the five-bit horizontal pixel counter before it is reinitialized to zero for a new horizontal line of the video image. Lastly, the pseudo-random number sequence is replicable for each horizontal line of the video image.

BRIEF DESCRIPTION OF THE DRAWINGS

The objects, features, and advantages of the present invention will be apparent from the following detailed description of the presently preferred and alternate embodiments of the invention with references to the drawings in which.

DETAILED DESCRIPTION PRESENTLY PREFERRED AND ALTERNATE EMBODIMENTS

A method and apparatus for generating replicable pseudo-random numbers in a digital video system based on a video control counter of the digital video system is disclosed. Under the disclosed method and apparatus, numbers that provide a good approximation for random numbers that are mutually independent and uniformly distributed within a specified area of a video image controlled by a video control counter are advantageously generated using the video control counter. The sequence length of the pseudo-random numbers is sufficiently long to outlast a run of the video control counter before the video control counter is reinitialized for a new instance of the specified area of the video image it controls. Furthermore, the pseudo-random number sequence generated is advantageously controllable and may be replicated for different instances of the same specified area of the video image controlled by the video control counter.

In the following description for purposes of explanation, specific numbers, materials and configurations are set forth in order to provide a thorough understanding of the present invention. However, it will be apparent to one skilled in the art that the present invention may be practiced without the specific details. In other instances, well known systems are shown in diagrammatical or block diagram form in order not to obscure the present invention unnecessarily.

Figure 1:
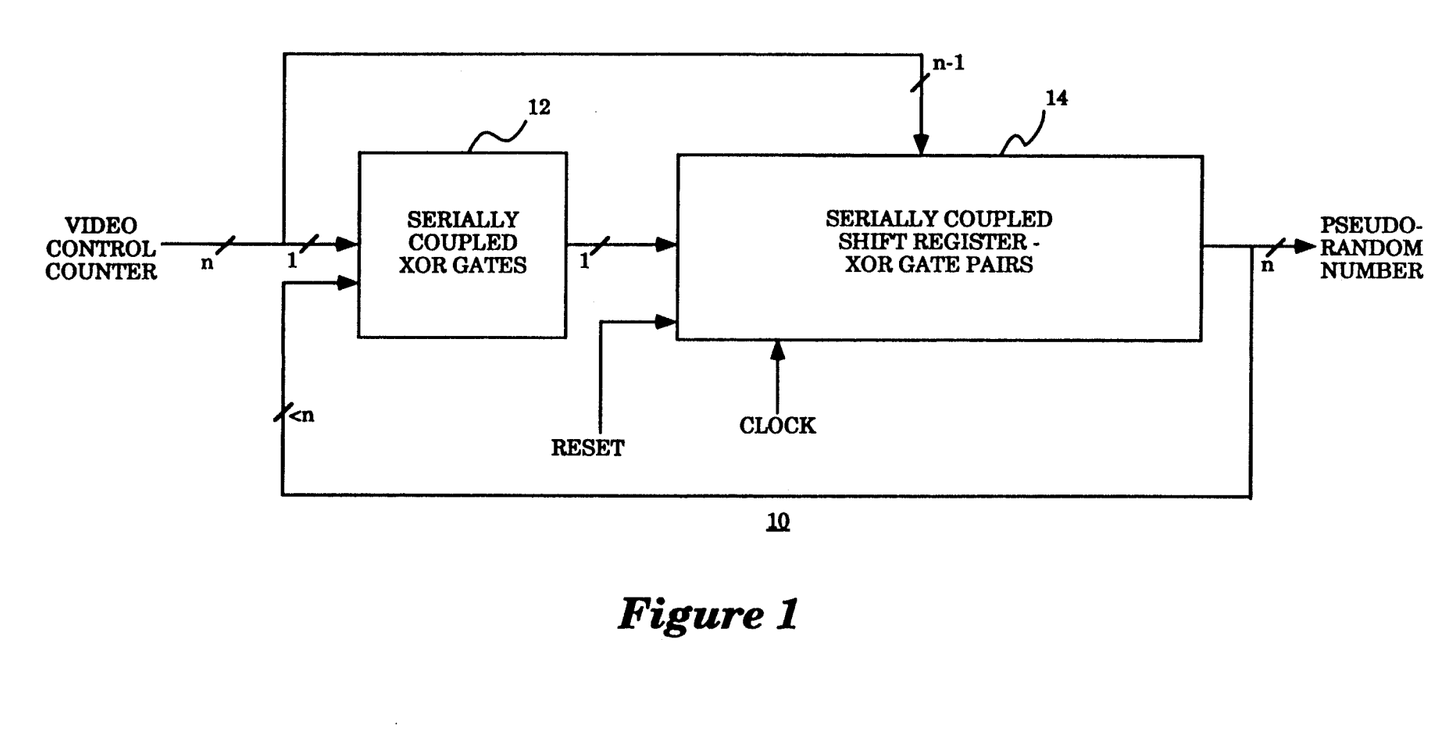
FIG. 1 illustrates the present invention for generating replicable pseudo-random number sequences based on a video control counter.

Referring now to FIG. 1, a block diagram illustrating the present invention for generating replicable pseudo-random numbers based on a video control counter is shown. Shown is an assembly of serially coupled XOR gates 12 coupled to an assembly of serially coupled shift register-XOR gate pairs 14. Both assemblies 12 are 14 are also coupled to the video control counter. The assembly of XOR gates 12 generate a shift-in bit for the assembly of shift register-XOR gate pairs 14 based on a cooperatively selected bit of a video control counter and a number of cooperatively selected feedback bits from the XOR gates of the assembly of shift register-XOR gate pairs 14, it received as inputs. The assembly of shift register-XOR gate pairs 14 in turn generates an n-bit pseudo-random number based on the shift-in bit and additional cooperatively selected n−1 bits of the video control counter. The outputs of the XOR gates of the shift register-XOR gates assembly 14 are cooperatively mapped to the various bits of the generated pseudo-random number. The two assemblies, 12 and 14, will be described in turn in further detail below with additional references to FIGS. 2-3.

Figure 2:
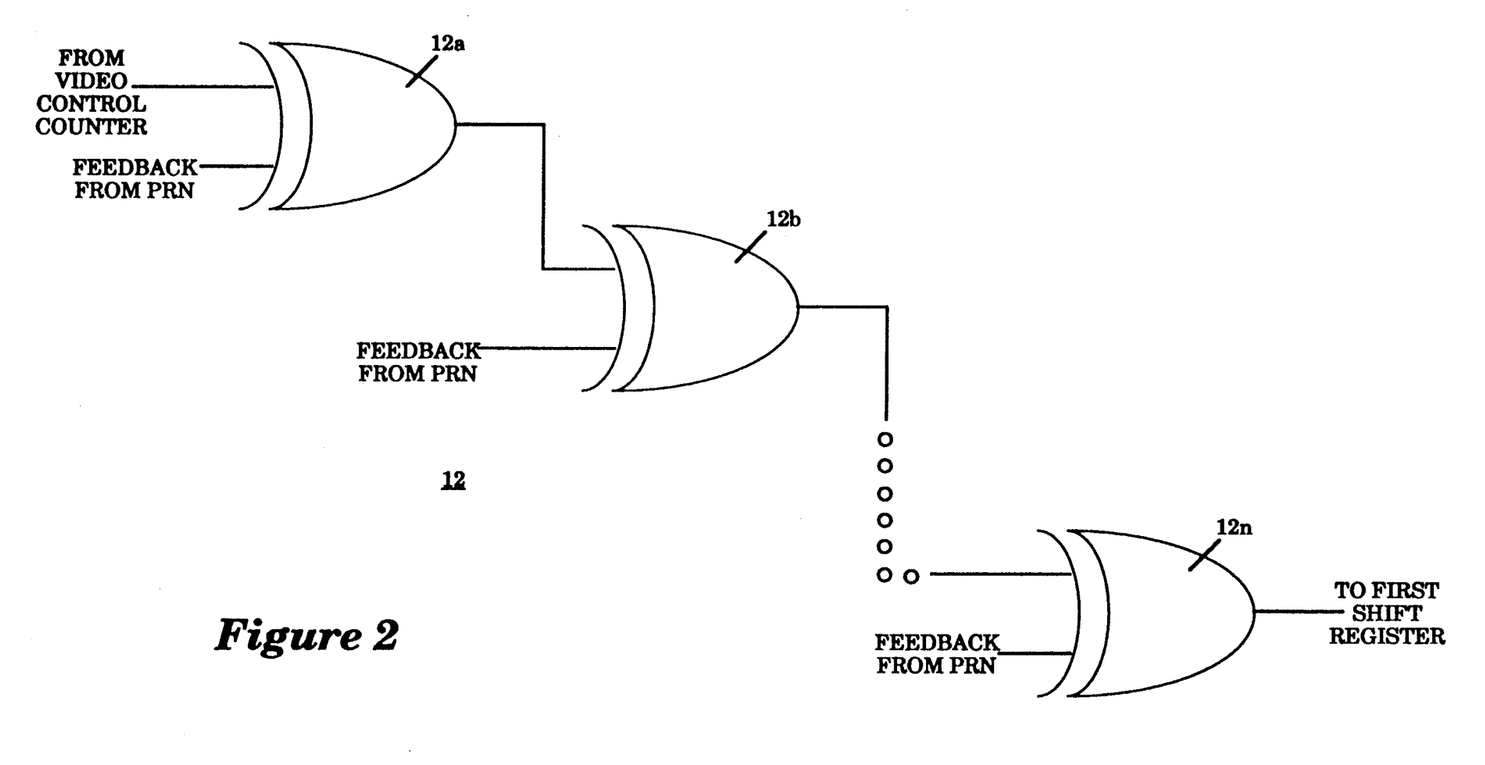
FIG. 2 illustrates the assembly of serially coupled XOR gates in further detail.

The assembly of serially coupled XOR gates 12 will first be described with additional references to FIG. 2. The first XOR gate 12a of the assembly of serially coupled XOR gate 12 receives the cooperatively selected bit of the video control counter and one of the cooperatively selected feedback bits from the assembly of shift register-XOR gate pair 14 as its inputs. Each of the remaining XOR gates 12b–2n receives the output bit of its antecedent XOR gate, 12a, ... or 12n−1, and one of the cooperatively selected feedback bits from the assembly of shift register-XOR gate pair 14 as its inputs. The output of the last XOR gate 12n is provided as the shift-in bit for the assembly of serially coupled shift register-XOR gate pairs 14.

Figure 3:
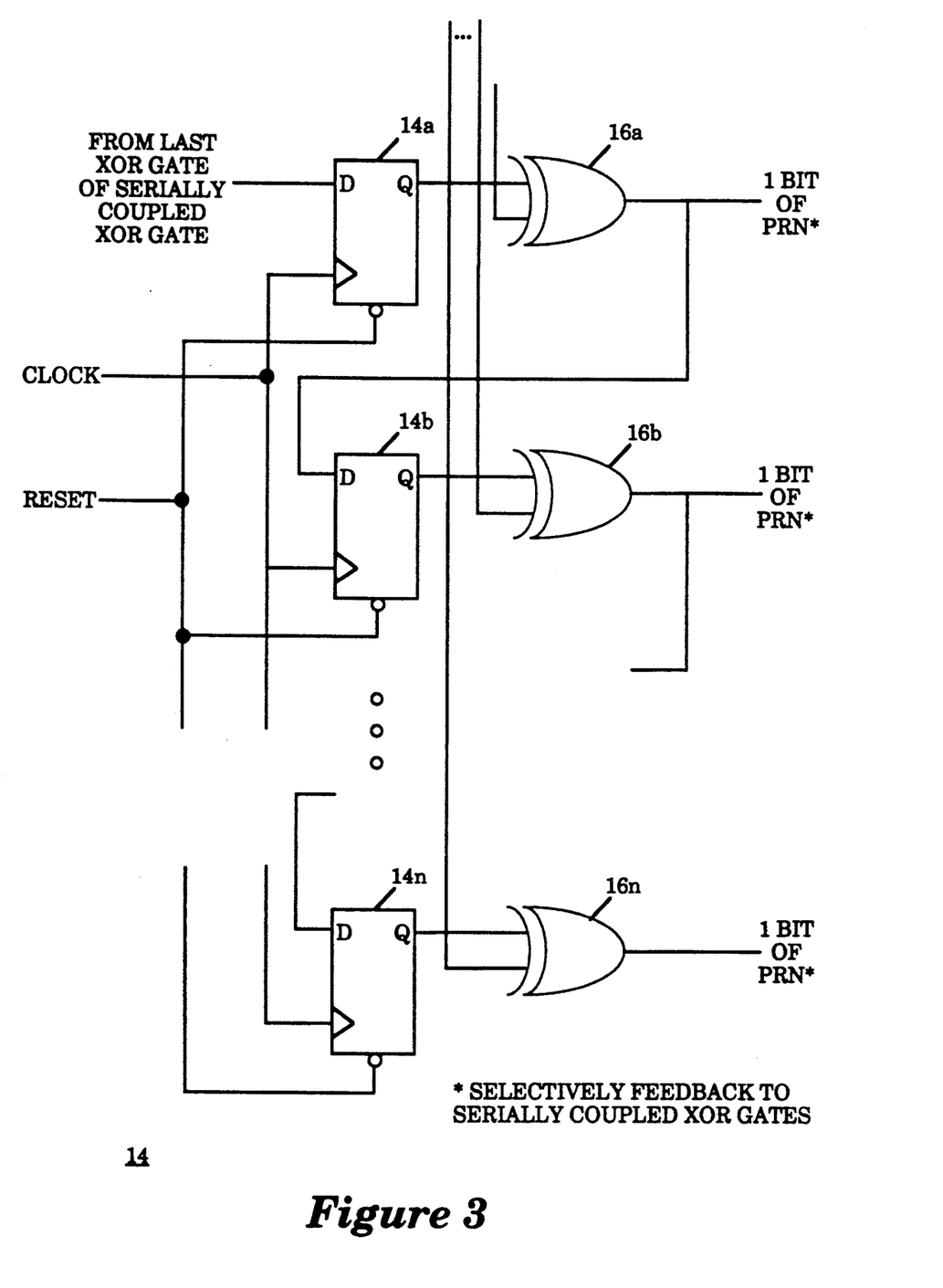
FIG. 3 illustrates the assembly of serially coupled shift register-XOR gate pairs in further detail.

The assembly of serially coupled shift register-XOR gate pairs 14 will now be described with references to FIGS. 1 and 3. The first shift register 14a receives the shift-in bit from the last XOR gate of the XOR gates assembly 12 as input. Each of the remaining shift registers, 14b–14n, receives a shift-in bit from the XOR gate, 16a–16n−1, corresponding to its antecedent shift register, 14a–14n−1, as input. Each of the XOR gates, 16a–16n, of the shift register-XOR gate pairs assembly 14 receives a shift-out bit from its corresponding shift register, 14a–14n, and one of the additional cooperatively selected bits of the video control counter as inputs. The shift registers, 14a–14n, shift their contents and generate shift-out bits for their corresponding XOR gates, 16a–16n. The corresponding XOR gate outputs are cooperatively mapped to the various bits of the generated pseudo-random number.

Except for the last corresponding XOR gate output, the corresponding XOR gate outputs are provided to the successive shift registers, 14b–14n, as shift-in bits for the generation of the next pseudo-random number. Similarly, selected outputs of the corresponding XOR gate outputs are provided to the XOR gates assembly 12 as feedback bits for the generation of the next pseudo-random number. The pseudo-random number sequence is repeated when the video control counter is reinitialized to a predetermined value, e.g. zero, and the shift registers, 14a–14n, are cleared to a predefined state, e.g. a zero state.

The provision of the various bits of the video control counter to the two assemblies, 12 and 14, the mapping of the XOR gate outputs of the shift register-XOR gate pairs assembly 14 to the various bits of the generated pseudo-random numbers, and the provision of the various bits of the generated pseudo-random numbers as feedback bits to the XOR gates assembly 12, are coordinated in a complimentary manner, such that the desired randomness, sequence length and replicability are achieved. The appropriate coordination may be determined in a variety of empirical manners including simulation over the specified area of the video image controlled by the video control counter.

Figure 4:
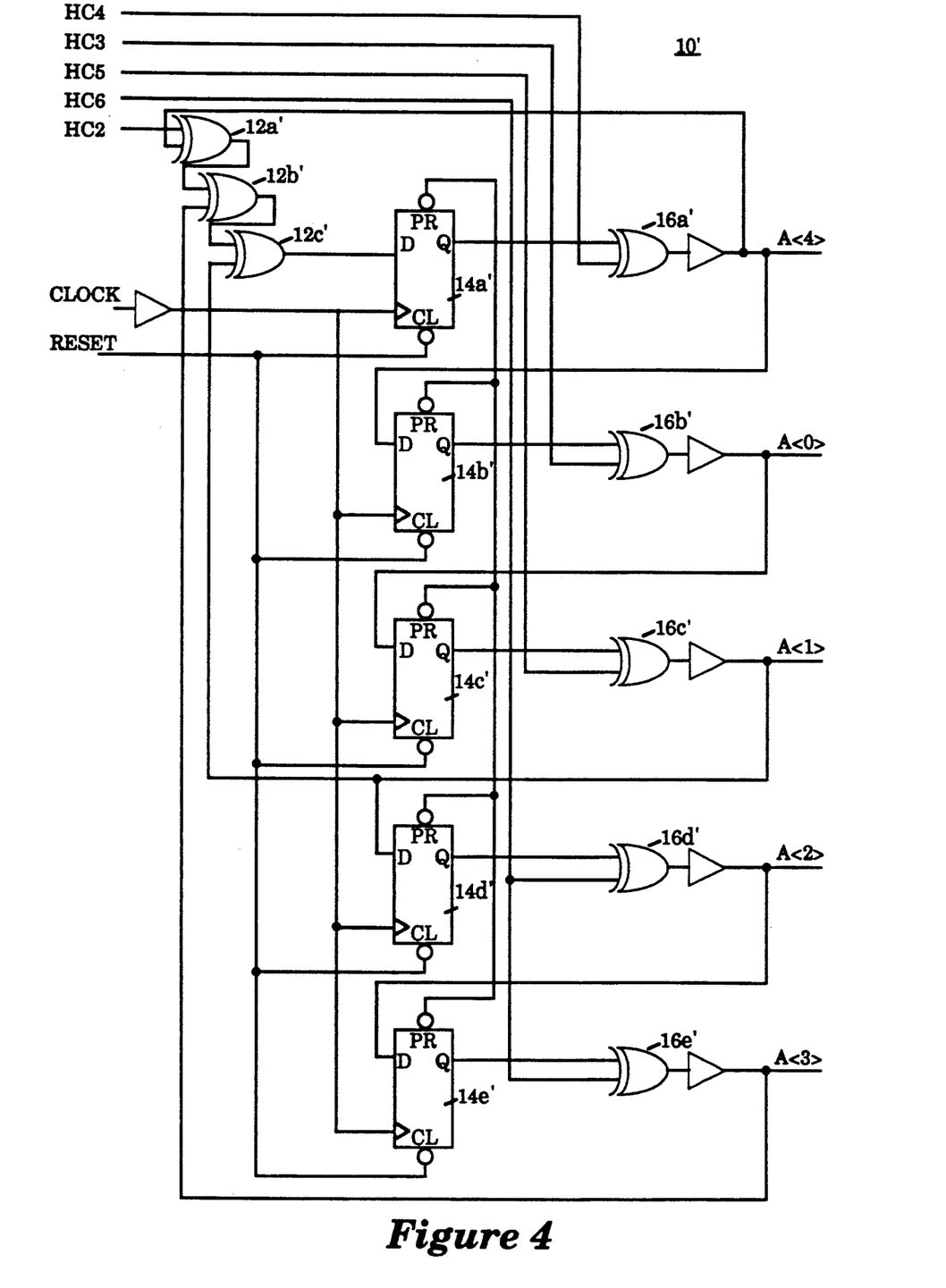
FIG. 4 illustrates one embodiment of the present invention for generating replicable five-bit pseudo-random numbers based on a horizontal pixel counter.

Referring now to FIG. 4, one embodiment of the present invention for generating replicable five-bit pseudo-random numbers based on a five-bit horizontal pixel counter is shown. For this embodiment, the assembly of serially coupled XOR gates comprises three serially coupled XOR gates, $12a'-12c'$, and the assembly of serially coupled shifted register-XOR gate pairs comprises five serially coupled shift register-XOR gate pairs, 14a' and 16a'-14e' and 16e'. The assembly of three serially coupled XOR gates generates a shift-in bit for the assembly of five serially coupled shift register-XOR gate pairs based on the lowest order bit of a horizontal pixel counter and three selected feedback bits from the assembly of five serially coupled shift register-XOR gate pairs. The three selected feedback bits are the highest, second highest, and second lowest order bit of the immediately antecedent pseudo-random number generated. The assembly of five serially coupled shift register-XOR gate pairs in turn generates a five-bit pseudo-random number based on the shift-in bit from the assembly of three serially coupled XOR gates and the four higher order bits of the horizontal pixel counter.

The first XOR gate 12a' of the assembly of three serially coupled XOR gates receives the lowest order bit of the horizontal pixel counter, and the highest order bit of the immediately antecedent pseudo-random number generated as inputs. The second and third XOR gates, 12b'-12c', of the assembly of the three serially coupled XOR gates receive the output bits of their corresponding antecedent XOR gates, 12a' and 12b', and the second highest and second lowest order bit of the immediately antecedent pseudo-random number generated as inputs respectively. The output of the third XOR gate 12c' is provided as the shift-in bit to the assembly of five serially coupled shift register-XOR gate pairs.

The first shift register 14a' receives the shift-in bit from the assembly of three serially coupled XOR gates as input. Each of the remaining shift registers, 14b'-14e', receives a shift-in bit from the corresponding XOR gate, 16a', ... or 16d', of its antecedent shift register, 14a', ... or 14d', as input. Each of the XOR gates, 16a'-16n', of the shift register-XOR gate pairs assembly receives a shift-out bit from its corresponding shift register, 14a'-14n', and one of the four high order bits of the horizontal pixel counter as inputs. More specifically, the first through third XOR gates, 16a'-16c', receive the third highest, second lowest, and second highest order bits of the horizontal pixel counter respectively. The fourth and the fifth XOR gates, 16d'-16e', receive the highest order bit of the horizontal pixel counter. The shift registers, 14a'-14n', shift their contents and generate shift-out bits for their corresponding XOR gates, 16a'-16n'. The first through fifth XOR gates output map to the highest, lowest, second lowest, third lowest, and second highest order bits of the generated pseudo-random number.

Except for the last corresponding XOR gate output, the corresponding XOR gate outputs are provided to the successive shift registers, 14b'-14n', as shift-in bits for the generation of the next pseudo-random number. As described earlier, the outputs of the first, third and fifth XOR gate, 16a', 16c', and 16e', are provided to the XOR gates assembly as feedback bits for the generation of the next pseudo-random number. The pseudo-random number sequence is repeated when the horizontal pixel counter is reinitialized to zero for a new horizontal line of a video image, and the shift registers, 14a'-14e', are cleared to a zero state.

As a result, the five-bit numbers generated provide a good approximation for five-bit random numbers that are mutually independent and uniformly distributed within a horizontal line of the video image. The sequence length of the five-bit pseudo-random numbers are sufficiently long to outlast a run of the five-bit horizontal pixel counter before it is reinitialized to zero for a new horizontal line of the video image. Lastly, the pseudo-random number sequence is replicable for each horizontal line of the video image.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is:

1. In a digital video system comprising a binary video control counter controlling a specified area of a video image, an apparatus for generating a pseudo-random number sequence based on said video control counter that is replicable for different instances of said specified area of said video image, said apparatus comprising:
   a) an assembly of serially coupled XOR gates coupled to said video control counter for receiving a sequence of single bits of a first selected control bit of said video control counter and a sequence of multiple selected feedback bits, and generating a sequence of single shift-in bits; and
   b) an assembly of serially coupled shift register-XOR gate pairs coupled to said video control counter and said assembly of serially coupled XOR gates for receiving said sequence of single shift-in bits and a sequence of multiple bits of additional selected control bits of said video control counter, and generating a sequence of multiple output bits, each group of multiple output bits being mapped in a predetermined manner to form a pseudo-random number of said replicable pseudo-random number sequence, each group of multiple output bits further being selected in a predetermined manner to form a group of multiple feedback bits of said sequence of multiple selected feedback bits, said sequence of single bits of said first selected control bit provided to said serially coupled XOR gates, said sequence of multiple bits of additional selected control bits provided to said serially coupled shift register-XOR gate pairs, said mapping of multiple output bits to form a pseudo-random number, and said selection of multiple output bits to form a group of multiple feedback bits being coordinated to cause said pseudo-random numbers to be mutually independent and uniformly distributed within said specified area of said video image, and said pseudo-random number sequence to have a repetition period sufficiently long to outlast a run of said video control counter for an instance of said specified area of said video image, said pseudo-random number sequence being replicated when said video control counter is reinitialized to a predetermined initial value, and shift registers of said assembly of serially coupled shift register-XOR gate pairs are reinitialized to a predefined state.

2. The apparatus as set forth in claim 1, wherein, said assembly of serially coupled XOR gates comprise:
   a.1) a first XOR gate coupled to said video control counter and said assembly of serially coupled shift register-XOR gate pairs for receiving said sequence of single bits of said first control bit of said video control counter and a first sequence of single feedback bits, and generating a sequence of single shift-in bit generation intermediate bits, each single feedback bit of said first sequence of single feedback bits being a first bit of a corresponding group of multiple feedback bits of said sequence of multiple feedback bits; and a.2) at least a second XOR gate coupled to said first XOR gate and said assembly of serially coupled shift register-XOR gate pairs for receiving said sequence of single shift-in bit generation intermediate bits and a second sequence of at least one feedback bit, and generating said sequence of single shift-in bits, each at least one feedback bit of said second sequence of at least one feedback bit being at least a second bit of a corresponding group of multiple feedback bits of said sequence of multiple feedback bits.

3. The apparatus as set forth in claim 1, wherein, said video control counter is a five-bit horizontal pixel counter controlling a horizontal line of said video image, said assembly of serially coupled XOR gates comprises:

a.1) a first XOR gate coupled to said horizontal pixel counter and said assembly of serially coupled shift register-XOR gate pairs for receiving said sequence of single bits of said first control bit of said video control counter and a first sequence of single feedback bits, and generating a first sequence of single shift-in bit generation intermediate bits, said first control bit being the lowest order bit of said horizontal pixel counter, each of said single feedback bits of said first sequence of single feedback bits being the highest order bit of a corresponding antecedent pseudo-random number of said pseudo-random number sequence;

a.2) a second XOR gate coupled to said first XOR gate and said assembly of serially coupled shift register-XOR gate pairs for receiving said sequence of single shift-in bit generation intermediate bits and a second sequence of single feedback bits, and generating a second sequence of single shift-in bit generation intermediate bits, each of said single feedback bits of said second sequence of single feedback bits being the second highest order bit of a corresponding antecedent pseudo-random number of said pseudo-random number sequence; and a.3) a third XOR gate coupled to said second XOR gate and said assembly of serially coupled shift register-XOR gate pairs for receiving said second sequence of single shift-in bit generation intermediate bits and a third sequence of single feedback bits, and generating said sequence of single shift-in bits, each of said single feedback bits of said third of sequence of single feedback bits being the second lowest order bit of a corresponding antecedent pseudo-random number of said pseudo-random number sequence.

4. The apparatus as set forth in claim 1, wherein, said assembly of serially coupled shift register-XOR gate pairs comprise:

b.1) a first shift register-XOR gate pair coupled to said assembly of serially coupled XOR gates for receiving said sequence of single shift-in bits and a first sequence of single bits of a first of said additional control bits of said video control counter, and generating a first sequence of single output bit, each of said single output bits of said first sequence of single output bits being a first bit of a corresponding group of multiple output bits of said sequence of multiple output bits; and b.2) at least a second shift register-XOR gate pair coupled to said first shift register-XOR gate pair and said video control counter for receiving a first sequence of single shift-out bits and a second sequence of at least one bit of at least a second of said additional control bits of said video control counter, and generating a second sequence of at least one output bits, each of said at least one output bit of said second sequence of at least one output bit being at least a second bit of a corresponding group of multiple output bits of said sequence of multiple output bits, said first sequence of single shift-out bits being said first sequence of single output bits.

5. The apparatus as set forth in claim 1, wherein, said video control counter is a five-bit horizontal pixel counter controlling a horizontal line of said video image, said assembly of serially coupled shift register-XOR gate pairs comprises:

b.1) a first shift register-XOR gate pair coupled to said assembly of serially coupled XOR gates for receiving said sequence of single shift-in bits and a first sequence of single bits of a first bit of said additional control bits of said video control counter, and generating a first sequence of single output bits, said first bit of said additional control bits of said video control counter being the third highest order bit of said horizontal pixel counter, each of said single output bits of said first sequence of single output bits being a first bit of a corresponding group of multiple output bits of said sequence of multiple output bits, said first bit of a group of multiple output bits being mapped to the highest order bit of a pseudo-random number;

b.2) a second shift register-XOR gate pair coupled to said first shift register-XOR gate and said horizontal pixel counter for receiving a first sequence of single shift-out bits and a second sequence of single bits of a second bit of said additional control bits of said video control counter, and generating a second sequence of single output bits, said second bit of said additional control bits of said video control counter being the second lowest order bit of said horizontal pixel counter, each of said single output bits of said second sequence of single output bits being a second bit of a corresponding group of multiple output bits of said sequence of multiple output bits, said second bit of a group of multiple output bits being mapped to the lowest order bit of a pseudo-random number, said first sequence of single shift-out bits being said first sequence of single output bits;

b.3) a third shift register-XOR gate pair coupled to said second shift register-XOR gate and said horizontal pixel counter for receiving a second sequence of single shift-out bits and a third sequence of single bits of a third bit of said additional control bits of said video control counter, and generating a third sequence of single output bits, said third bit of said additional control bits of said video control counter being the second highest order bit of said horizontal pixel counter, each of said single output bits of said third sequence of single output bits being a third bit of a corresponding group of multiple output bits of said sequence of multiple output bits, said third bit of a group of multiple output bits being mapped to the second lowest order bit of a pseudo-random number, said second sequence of single shift-out bits being said second sequence of single output bits;

b.4) a fourth shift register-XOR gate pair coupled to said third shift register-XOR gate and said horizontal pixel counter for receiving a third sequence of single shift-out bits and a fourth sequence of single bits of a fourth bit of said additional control bits of said video control counter, and generating a fourth sequence of single output bits, said fourth bit of said additional control bits of said video control counter being the highest order bit of said horizontal pixel counter, each of said single output bits of said fourth sequence of single output bits being a fourth bit of a corresponding group of multiple output bits of said sequence of multiple output bits, said fourth bit of a group of multiple output bits being mapped to the third lowest order bit of a pseudo-random number, said third sequence of single shift-out bits being said third sequence of single output bits;

b.5) a fifth shift register-XOR gate pair coupled to said fourth shift register-XOR gate pair and said horizontal pixel counter for receiving a fourth sequence of single shift-out bits and a fifth sequence of single bits of said fourth bit of said additional control bits of said video control counter, and generating a fifth sequence of single output bits, each of said single output bits of said fifth sequence of single output bits being a fifth bit of a corresponding group of multiple output bits of said sequence of multiple output bits, said fifth bit of a group of multiple output bits being mapped to the second highest order bit of a pseudo-random number, said fourth sequence of single shift-out bits being paid fourth sequence of said single output bits.

6. In a digital video system comprising a binary video control counter controlling a specified area of a video image, a method for generating a pseudo-random number sequence based on said video control counter that is replicable for different instances of said specified area of said video image, said method comprising the steps of:

a) receiving a sequence of single bits of a first selected control bit of said video control counter and a sequence of multiple selected feedback bits, and generating a sequence of single shift-in bits; and b) receiving said sequence of single shift-in bits and a sequence of multiple bits of additional selected control bits of said video control counter, and generating a sequence of multiple output bits, each group of multiple output bits being mapped in a predetermined manner to form a pseudo-random number of said replicable pseudo-random number sequence, each group of multiple output bits further being selected in a predetermined manner to form a group of multiple feedback bits of said sequence of multiple selected feedback bits, said sequence of single bits of said first selected control bit provided, said sequence of multiple bits of additional selected control bits provided, said mapping of multiple output bits to form a pseudo-random number, and said selection of multiple output bits to form a group of multiple feedback bits being coordinated to cause said pseudo-random numbers to be mutually independent and uniformly distributed within said specified area of said video image, and said pseudo-random number sequence to have a repetition period sufficiently long to outlast a run of said video control counter for an instance of said specified area of said video image, said pseudo-random number sequence being replicated when said video control counter is reinitialized to a predetermined initial value, and shift register state for generating said sequence of multiple output bits is reinitialized to a predefined state.

7. The method as set forth in claim 6, wherein, said step a) comprises the steps of:

a.1) receiving said sequence of single bits of said first control bit of said video control counter and a fi sequence of single feedback bits, and generating a sequence of single shift-bit generation intermediate bits, each single feedback bit of said first sequence of single feedback bits being a first bit of a corresponding group of multiple feedback bits of said sequence of multiple feedback bits; and a.2) receiving said sequence of single shift-in bit generation intermediate bits and a second sequence of at least one feedback bit, and generating said sequence of single shift-in bits, each at least one feedback bit of said second sequence of at least one feedback bit being at least a second bit of a corresponding group of multiple feedback bits of said sequence of multiple feedback bits.

8. The method as set forth in claim 6, wherein, said video control counter is a five-bit horizontal pixel counter controlling a horizontal line of said video image, said step a) comprises the steps of:

a.1) receiving said sequence of single bits of said first control bit of said video control counter and a first sequence of single feedback bits, and generating a first sequence of single shift-in bit generation intermediate bits, said first control bit being the lowest order bit of said horizontal pixel counter, each of said single feedback bits of said first sequence of single feedback bits being the highest order bit of a corresponding antecedent pseudo-random number of said pseudo-random number sequence;

a.2) receiving said sequence of single shift-in bit generation intermediate bits and a second sequence of single feedback bits, and generating a second sequence of single shift-in bit generation intermediate bits, each of said single feedback bits of said second sequence of single feedback bits being the second highest order bit of a corresponding antecedent pseudo-random number of said pseudo-random number sequence; and a.3) receiving said second sequence of single shift-in bit generation intermediate bits and a third sequence of single feedback bits, and generating said sequence of single shift-in bits, each of said single feedback bits of said third of sequence of single feedback bits being the second lowest order bit of a corresponding antecedent pseudo-random number of said pseudo-random number sequence.

9. The method as set forth in claim 6, wherein, said step b) comprises the steps of:

b.1) receiving said sequence of single shift-in bits and a first sequence of single bits of a first of said additional control bits of said video control counter, and generating a first sequence of single output bits, each of said single output bits of said first sequence of single output bits being a first bit of a corresponding group of multiple output bits of said sequence of multiple output bits; and b.2) receiving a first sequence of single shift-out bits and a second sequence of at least one bit of at least a second of said additional control bits of said video control counter, and generating a second sequence of at least one output bit, each of said at least one output bit of said second sequence of at least one output bit being at least a second bit of a corresponding group of multiple output bits of said sequence of multiple output bits, said first sequence of single shift-out bits being said first sequence of single output bits.

10. The method as set forth in claim 6, wherein, said video control counter is a five-bit horizontal pixel counter controlling a horizontal line of said video image, said step b) comprises the steps of:

b.1) receiving said sequence of single shift-in bits and a first sequence of single bits of a first bit of said additional control bits of said video control counter, and generating a first sequence of single output bits, said first bit of said additional control bits of said video control counter being the third highest order bit of said horizontal pixel counter, each of said single output bits of said first sequence of single output bits being a first bit of a corresponding group of multiple output bits of said sequence of multiple output bits, said first bit of a group of multiple output bits being mapped to the highest order bit of a pseudo-random number;

b.2) receiving a first sequence of single shift-out bits and a second sequence of single bits of a second bit of said additional control bits of said video control counter, and generating a second sequence of tingle output bits, said second bit of said additional control bits of said video control counter being the second lowest order bit of said horizontal pixel counter, each of said single output bits of said second sequence of single output bits being a second bit of a corresponding group of multiple output bits of said sequence of multiple output bits, said second bit of a group of multiple output bits being mapped to the lowest order bit of a pseudo-random number, said first sequence of single shift-out bits being said first sequence of single output bits;

b.3) receiving a second sequence of single shift-out bits and a third sequence of single bits of a third bit of said additional control bits of said video control counter, and generating a third sequence of single output bits, said third bit of said additional control bits of-said video control counter being the second highest order bit of said horizontal pixel counter, each of said single output bits of said third sequence of single output bits being a third bit of a corresponding group of multiple output bits of said sequence of multiple output bits, said third bit of a group of multiple output bits being mapped to the second lowest order bit of a pseudo-random number, said second sequence of single shift-out bits being said second sequence of single output bits;

b.4) receiving a third sequence of single shift-out bits and a fourth sequence of single bits of a fourth bit of said additional control bits of said video control counter, and generating a fourth sequence of single output bits, said fourth bit of said additional control bits of said video control counter being the highest order bit of said horizontal pixel counter, each of said single output bits of said fourth sequence of single output bits being a fourth bit of a corresponding group of multiple output bits of said sequence of multiple output bits, said fourth bit of a group of multiple output bits being mapped to the third lowest order bit of a pseudo-random number, said third sequence of single shift-out bits being said third sequence of single output bits;

b.5) receiving a fourth sequence of single shift-out bits and a fifth sequence of single bits of said fourth bit of said additional control bits of said video control counter, and generating a fifth sequence of single output bits, each of said single output bits of said fifth sequence of single output bits being a fifth bit of a corresponding group of multiple output bits of said sequence of multiple output bits, said fifth bit of a group of multiple output bits being mapped to the second highest order bit of a pseudo-random number, said fourth sequence of single shift-out bits being said fourth sequence of said single output bits.

* * * * *